April 24, 1934. G. W. MULLER Re. 19,147

BAR PLATE OR RAIL JOINT BAR

Original Filed May 18, 1928 2 Sheets-Sheet 1

INVENTOR

George W. Muller,

By O. P. Woehaupter

Attorney

April 24, 1934. G. W. MULLER Re. 19,147

BAR PLATE OR RAIL JOINT BAR

Original Filed May 18, 1928 2 Sheets-Sheet 2

Inventor
George W. Muller,
By D. P. Woehampter
Attorney

Reissued Apr. 24, 1934

Re. 19,147

UNITED STATES PATENT OFFICE 19,147

BAR PLATE OR RAIL-JOINT BAR

George W. Muller, Washington, D. C., assignor, by mesne assignments, to The Rail Joint Company, New York, N. Y., a corporation of New York Original No. 1,720,372, dated July 9, 1929, Serial No. 278,766, May 18, 1928. Application for reissue July 19, 1932, Serial No. 623,428

9 Claims. (Cl. 238—243)

This invention relates to a new and improved splice bar for connecting together the meeting ends of railway rails to produce a new and improved rail joint, and has for its general object to provide a splice bar which is effective to produce a strong and durable joint in which the rail ends are maintained high and firmly connected together in alined relationship without requiring frequent tightening of the joint bolts.

Rail joints as heretofore produced generally have been characterized by extreme rigidity, which has been found to prevent the natural wave motion of the rails from passing through the joint, with many consequent and serious disadvantages. Accordingly, a special object of the invention is to provide a rail joint in which the natural wave motion of the rails is permitted to pass substantially uninterruptedly through the joint, whereby the disadvantages inherent to a rigid joint are substantially eliminated.

According to the invention the splice bar is formed to have loading engagement medially with head portions of the rails, to have clearance outwardly from its medial portion to its ends from the under sides of the rail heads and from the rail webs, and to have fishing engagement at its bottom with the upper faces of the rail flanges. Thus, when the joint bolts, particularly those at the ends of the bar, are tightened, drawing the resilient ends of the bar inwardly and upwardly, one result is to store energy in the bar so that as wear occurs or any looseness tends to develop it is automatically taken up. At the same time, due to the wedging coaction of the bottom of the bar with the upper faces of the rail flanges, drawing of the ends of the bar inwardly tends to lift the bar, with the result that its medial portion, under the influence of the stored energy in the bar, tends to lift the rail ends and to maintain them high. Moreover, due particularly to the clearances of the end portions of the bar from the heads and the webs of the rails and to the relatively short length of the medial loading portion of the bar, the joint is rendered amply flexible to permit the natural wave motion of the rails to pass substantially uninterruptedly therethrough without impairing the strength of the joint or detracting from its ability to maintain the rail ends high.

In connection with a splice bar and rail joint of the general character mentioned another object of the invention is so to join the end portions of the bar with the medial portion thereof as greatly to facilitate the lifting of the medial portion when the end portions are flexed inwardly.

A further object of the invention is to provide a rail joint the tightness, firmness and general efficiency of which is increased by the action of traffic passing thereover.

With the general purposes aforementioned and various other objects in view, which will become more fully apparent as the nature of the invention is better understood, the same consists in the novel combination and arrangement of features as will be hereinafter more fully described, illustrated in the accompanying drawings and defined in the appended claims.

In the drawings, wherein like characters of reference denote corresponding parts in related views:—

Figure 1:
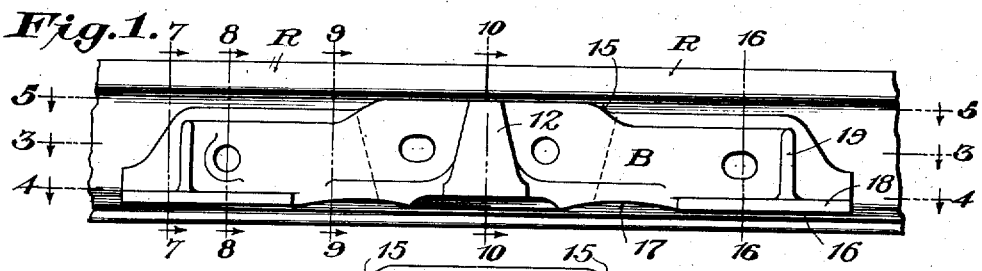
Figure 1 is a side elevation of a splice bar and rail joint constructed in accordance with one practicable embodiment of the invention.

Figures 7, 8, 9 and 10 are transverse sections taken approximately on the lines 7—7, 8—8, 9—9 and 10—10, respectively, of Fig. 1.

Figure 11:
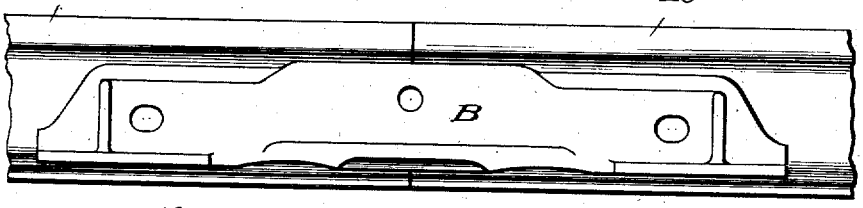
Figure 12:
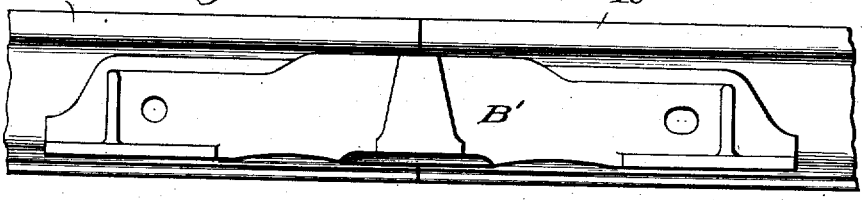

Figures 11 and 12 are views similar to Fig. 1 illustrating slightly alternative embodiments of the invention.

Figure 13:
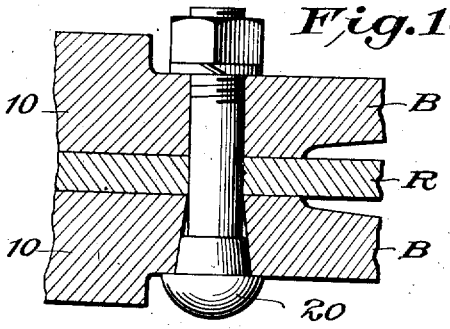

Figure 13 is a detail horizontal section to illustrate that bolts may extend through the medial, relatively thick portion of the bar.

Figure 14:
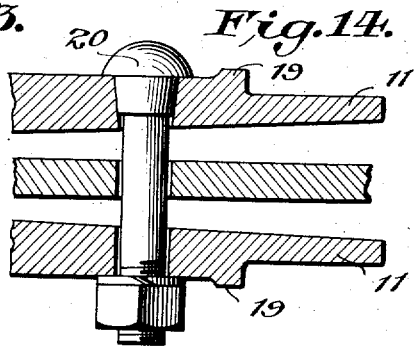

Figure 14 is a detail horizontal section illustrating the bolt at one end of the joint.

Figure 15:
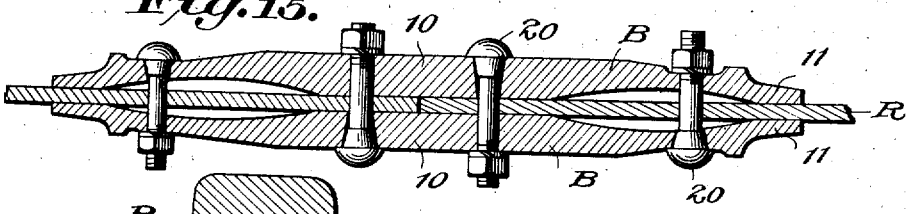
Figure 16:
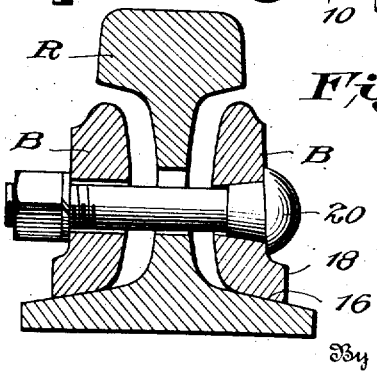

Figure 15 is a horizontal section through the rail joint illustrated in Figs. 1 to 10 showing the ends of the splice bar drawn fully inward; and Figure 16 is a transverse section taken approximately on the line 16—16 of Fig. 1.

Referring to the drawings in detail, first to the embodiment of the invention illustrated in Figs. 1 to 10, 13 and 16, it will be observed that a complete rail joint is shown wherein the meeting end portions of the rails are designated generally as R, R and the cooperating splice bars as B, B. However, since the splice bars are duplicates of each other, as also is the joint to either side of the rails, only one of the bars and only one side of the joint will be described in detail in order to avoid possible confusion and unnecessary repetition. Accordingly, selecting either of the splice bars for descriptive purposes, it will be noted that the same is inclusive of a relatively thick, heavy and inherently rigid medial portion designated as 10, and resilient end portions of relatively less thickness designated as 11, 11, respectively.

Figure 2:
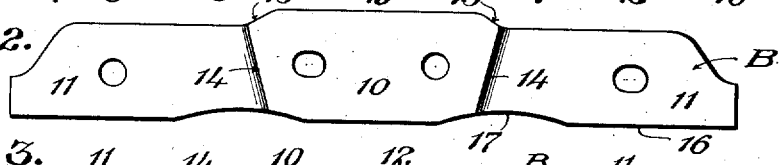
Figure 2 is an elevation of the splice bar shown in Fig. 1 looking towards the inner face of the bar.
Figure 3:
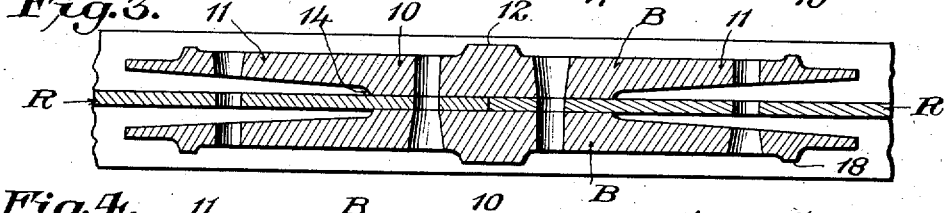
Figure 3 is a horizontal section taken approximately on the line 3—3 of Fig. 1.
Figure 4:
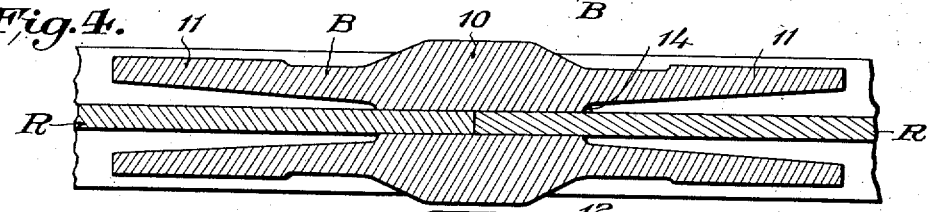
Figure 4 is a horizontal section taken approximately on the line 4—4 of Fig. 1.
Figure 5:
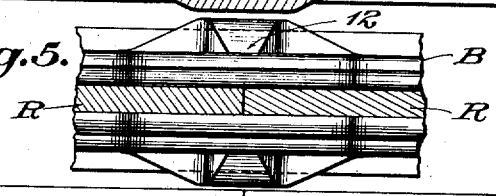
Figure 5 is a horizontal section taken approximately on the line 5—5 of Fig. 1.
Figure 6:
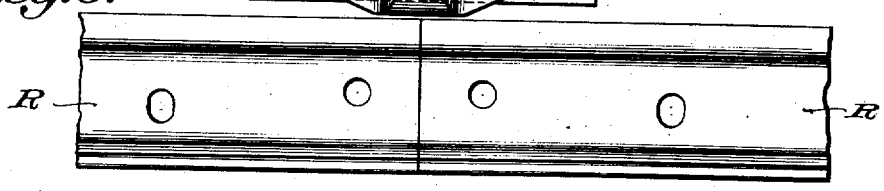
Figure 6 is a side elevation of the rail ends with the splice bar removed.
Figures 7, 8, 9, 10:
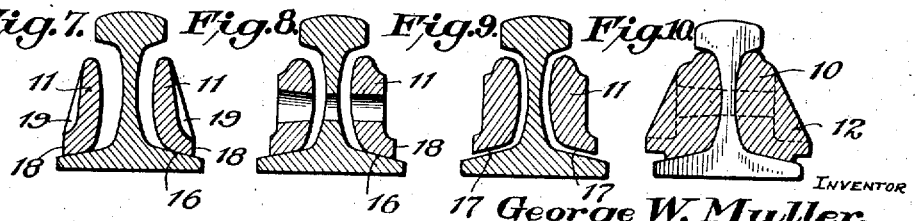

In the present instance the medial portion 10 of the bar corresponds in height to the fishing height of the rails and is formed at its top to have fishing engagement with the under sides of the rail heads, at its bottom to have fishing engagement with the upper faces of the rail flanges, and has its inner face transversely convexed to conform in contour to the rail webs and to fit snugly thereagainst, all as clearly illustrated in Figs. 2, 3 and 10 of the drawings. Moreover, said medial portion, which may be of any suitable length to extend any suitable distance inwardly from the rail ends, preferably is itself medially reinforced at its outer side by a rib or thickened portion 12 extending substantially from top to bottom thereof and merging at its bottom into a horizontally disposed stiffening rib or flange 13 which may extend any suitable distance to either side of said portion 12 outwardly along the end portions 11, 11 of the bar.

Where the end portions 11, 11 of the bar join the medial portion 10 thereof the inner faces of the end portions are stepped outwardly relatively to the inner face of the medial portion as indicated at 14, while from said lines of junction the inner faces of said end portions are inclined outwardly to their ends relatively to the plane of the bar whereby, when the bar is operatively engaged with the rails, a clearance space of progressively increasing width to the end of the bar is provided between the inner face of each end portion 11 and the adjacent face of the related rail web.

Regarding the end portions 11, 11 of the bar, it will be noted that they taper in thickness to their outer ends and that their tops are stepped downwardly as at 15, relatively to the top fishing surface of the medial portion 10 of the bar thereby to afford desired clearances from the under sides of the rail heads. Also, it will be noted that the bottoms of the end portions 11, 11 are formed at their outer ends to have fishing engagement with the upper faces of the rail flanges as indicated at 16, and that, between the medial portion 10 and said fishing engagement portions 16, which portions 16 may be of any suitable length, the bottoms of said end portions 11 are stepped upwardly as indicated at 17 to afford clearances from the rail flanges.

Preferably, but not necessarily, flanges 18 are formed to extend outwardly from the end portions 11, 11 of the bar at the bottoms of the outer ends thereof to reinforce the bar at these points and to provide relatively wide surfaces for fishing engagement with the upper faces of the rail flanges. Also, vertical reinforcing webs 19 preferably are provided to extend upwardly from the reinforcing flanges 18 near the ends of the bar. As in the case of the flanges 18, however, the webs 19 are not essential and may be omitted if desired.

Reverting to the lines of junction 14 between the ends of the medial portion 10 and the inner ends of the resilient portions 11, 11 of the bar, it will be observed by particular reference to Figs. 1 and 2 of the drawings that said junction lines incline or converge downwardly and inwardly. Thus, due to the reduction in thickness of the end portions 11, 11 along the lines 14 relatively to the comparatively thick, stiff and rigid medial portion 10 and to the natural tendency of the end portions when they are drawn inwardly to flex or bend along said lines 14, the result is that when the end portions are drawn inwardly and are elevated by the wedging engagement of their bottoms with the inwardly and upwardly inclined top faces of the rail flanges, a much more pronounced and effective lifting of the medial portion 10 of the bar is produced than if, for example, the lines of junction 14 were vertical.

Obviously, since tightening of the joint by drawing the resilient end portions 11, 11 of the bar inwardly results in lifting of the medial portion of the bar and consequent lifting of the rail ends, the latter are maintained high. Moreover, it is apparent in this connection that the effective loading engagement of the medial portion 10 of the bar is at its top with the head portions of the rails. However, by reason of the loading engagement of the bottom of the medial portion with the upper faces of the rail flanges, depression of the end of either rail causes equal depression of the end of the other rail with the result that rail end batter is substantially eliminated, while by reason of the snug engagement of the inner face of the medial portion 10 of the bar with the rail webs, the rail ends are held rigidly and effectively against any lateral disalinement.

The only essential in respect to the joint bolts 20 is that there shall be at least one bolt located near the outer end of each end portion of the bar for the purpose of drawing said end portions inwardly. This is indicated in Fig. 12 of the drawings wherein the bar B′ is illustrated as having only two bolt holes. Alternatively, Fig. 11 illustrates a bar having three bolt holes, one near the outer end of each end portion of the bar and one at the middle of the bar. Ordinarily, however, the use of four bolt holes is contemplated, one near the outer end of each end portion of the bar and one near each end of the medial portion of the bar, as clearly illustrated in Figs. 1 to 3 and 13 to 16.

While the clearances 17 at the bottoms of the end portions 11, 11 of the bar are not essential, they preferably are provided for cooperation with the clearances at the tops and the inner faces of said end portions to permit the natural wave motion of the rails to pass substantially uninterruptedly through the joint. In this connection it is apparent that the downward and inward inclination of the lines of junction 14 between the medial and the end portions of the bar results in the loading engagement of the medial portion of the bar at its top with the rail heads being of greater length than the loading engagement at the bottom of said medial portion with the rail flange, which is further conducive to permitting the natural wave motion of the rails to pass substantially uninterruptedly through the joint while affording all necessary longitudinal extent of the loading engagement at the top of the medial portion of the bar with the rails to sustain the load and to maintain the rail ends high.

Regarding the bolt holes in the bar and the rails, these are formed to permit free inward flexure and upward vertical movement of the bars ends relatively to the rails.

In a rail joint employing splice bars of the character described, it is apparent that when the end portions of the bars are drawn inwardly the medial portions of the bars are caused firmly to clamp the terminal end portions of the rails there-between and to exert a constant lifting effort on the rail ends due to the combined inward and upward flexure of the resilient bar ends. Thus, the joint is maintained tight with the rail ends disposed high and in alinement, particularly, since the more the rail ends are driven downwardly the tighter the joint becomes because of the wedging of the downwardly tapered upper portions of the rail webs between the medial portions of the splice bars until, when once the rail ends become thoroughly seated between the medial portions of the bars, little or no wear or looseness at the medial portion of the joint thereafter occurs. In this connection it will be observed that the medial portions of the bars increase in thickness downwardly, which feature, combined with the vertically and longitudinally extending stiffening ribs or flanges 12, 13, results in a wider distribution of the load not only downwardly but outwardly towards the ends of the bars.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. In a rail joint, the rails, and a splice bar connecting the rail ends, the medial portion of said bar being of greater width and thickness than the end portions thereof and having head and base loading engagement with head and base portions of the rails, respectively, the inner face of said medial portion conforming in shape to the rail webs and fitting snugly thereagainst, the head loading engagement of said medial portion with the rails being of greater length than the base loading engagement of said portion with the bases of the rails, the end portions of the bar being resilient and from said medial portion outwardly to their ends having clearance from the rail webs and clearance from the under sides of the rail heads, said end portions having fishing engagement at their bottoms with the upper faces of the rail flanges, and joint bolts operable to draw the end portions of the bar inwardly to place said medial portion under heavy spring pressure against the rail webs and to exert a constant lifting effort on the rail ends.

2. In a rail joint, the rails, and a splice bar connecting the rail ends, the medial portion of said bar being wider and thicker than the end portions thereof and having head and base loading engagement with head and base portions of the rails, respectively, the end portions of the bar being resilient and from said medial portion outwardly to their ends diminishing in thickness to their extremities and having clearance from the rail webs and clearance from the under sides of the rail heads, said end portions having base fishing engagement at their ends with the upper faces of the rail flanges and clearance throughout their widths from the rail flanges between their ends and said medial portion, and joint bolts operable to draw the end portions of the bar inwardly to place said medial portion under heavy spring pressure against said rails and to exert a constant lifting effort on the rail ends.

3. In a rail joint, the rails, and a splice bar connecting the rail ends, the medial portion of said bar being of greater width and thickness than the end portions thereof and having head and base loading engagement with head and base portions of the rails, respectively, the inner face of said medial portion conforming in contour to the rail webs and fitting thereagainst, the end portions of the bar being resilient and from said medial portion outwardly to their ends having clearance from the rail webs and clearance from the under sides of the rail heads, said end portions having fishing engagement at their bottoms with the upper faces of the rail flanges, and joint bolts operable to draw the end portions of the bar inwardly to place said medial portion under heavy spring pressure against the rail webs and to exert a constant lifting effort on the rail ends.

4. In a rail joint, the rails, and a splice bar connecting the rail ends, the medial portion of said bar being of greater thickness than the end portions thereof and having head and base fishing engagement with the under sides of the rail heads and the upper faces of the rail flanges, respectively, the inner face of said medial portion conforming in shape to the rail webs and fitting snugly thereagainst, the end portions of the bar being resilient and having clearance from the rail webs, clearance from the under sides of the rail heads, and fishing engagement with the upper faces of the rail flanges, and joint bolts operable to draw the end portions of the bar inwardly to place said medial portion under heavy spring pressure against the rail webs and to exert a constant lifting effort on the rail ends, the inner faces of the end portions of the bar being inclined outwardly from the medial portion of the bar whereby the clearances between the end portions of the bar and the rail webs progressively increase in width towards the ends of the bar.

5. In a rail joint, the rails, and a splice bar connecting the rail ends, the medial portion of said bar being of greater width and thickness than the end portions thereof and having head and base fishing engagement with the under sides of the rail heads and the upper faces of the rail flanges, respectively, the head fishing engagement of said medial portion with the rails being of greater length than the base fishing engagement of said portion with the rails, the end portions of said bar being resilient and being tapered in thickness from said medial portion to their ends and having clearance from the rail webs, clearance from the under sides of the rail heads, base fishing engagement at their ends with the upper faces of the rail flanges and clearance from the rail flanges between their ends and said medial portion, the inner faces of said end portions being inclined outwardly from the medial portion of the bar whereby the clearances between the end portions of the bar and the rail webs progressively increase in width towards the ends of the bar, and joint bolts operable to draw the end portions of the bar inwardly to place said medial portion under heavy spring pressure against said rails and to exert a constant lifting effort on the rail ends.

6. In a rail joint, the rails, and a splice bar connecting the rail ends, the medial portion of said bar being of greater width and thickness than the end portions thereof and having head and base fishing engagement with the under sides of the rail heads and the upper faces of the rail flanges, respectively, the head fishing engagement of said medial portion with the rails being of greater length than the base fishing engagement of said portion with the rails, the inner face of said medial portion conforming in contour to the rail webs and fitting thereagainst, the end portions of said bar being resilient and being tapered in thickness from said medial portion to their ends and having clearance from the rail webs, clearance from the under sides of the rail heads, base fishing engagement at their ends with the upper faces of the rail flanges and clearance from the rail flanges between their ends and said medial portion, the inner faces of said end portions being inclined outwardly from the medial portion of the bar whereby the clearances between the end portions of the bar and the rail webs progressively increases in width towards the ends of the bar, and joint bolts operable to draw the end portions of the bar inwardly to place said medial portion under heavy spring pressure against said rails and to exert a constant lifting effort on the rail ends.

7. In a rail joint, the rails, and a splice bar connecting the rail ends, the medial portion of said bar being higher and thicker than the end portions thereof and said medial portion having loading engagement with the heads and bases of the rails, and also having its inner face conforming in shape to the rail webs and fitting snugly thereagainst, the end portions of the bar being resilient and from said medial portion outwardly having clearance from the rail web and clearance from the under sides of the rail heads, said end portions having fishing engagement at their bottoms with the upper faces of the rail flanges, and joint bolts operable to draw the end portions of the bar inwardly to place said medial portion under heavy spring pressure against the rail webs and to exert a constant lifting effort on the rail ends, the lines of junction of the end portions of the bar with the medial portion thereof extending downwardly and inwardly.

8. In a rail joint, the rails, and a splice bar connecting the rail ends, the medial portion of said bars being of greater width and thickness than the end portions thereof and having loading engagement with the heads of the rails, the inner face of said medial portion conforming in contour to the rail webs and fitting thereagainst, the end portions of the bar being resilient and from said medial portion outwardly to their ends having clearance from the webs of the rails and clearance from the under sides of the heads of the rails, said medial and end portions having fishing engagement at their bottoms with the upper faces of the rail flanges, and joint bolts operable to draw the end portions of the bars inwardly to place said medial portion under heavy spring pressure against the rail webs and to exert a constant lifting effort on the rail ends.

9. A splice bar for connecting together the meeting ends of a pair of rails, said bar comprising a medial portion formed to take loading engagement with head and base portions of the rails and to have its inner face fit snugly against the rail webs and resilient end portions of less width and thickness than said medial portion, the length of said medial portion at its top being greater than at its bottom, and said end portions being formed to have clearance from the rail webs, clearance from the under sides of the rail heads and fishing engagement with the upper sides of the rail flanges.

GEORGE W. MULLER.